May 12, 1970     R. L. ROBERTS ET AL     3,512,084
ELECTRICAL TEST PROBE DEVICE WITH SHORTING
AND REVERSING SWITCH MEANS
Filed Oct. 18, 1967     2 Sheets-Sheet 1
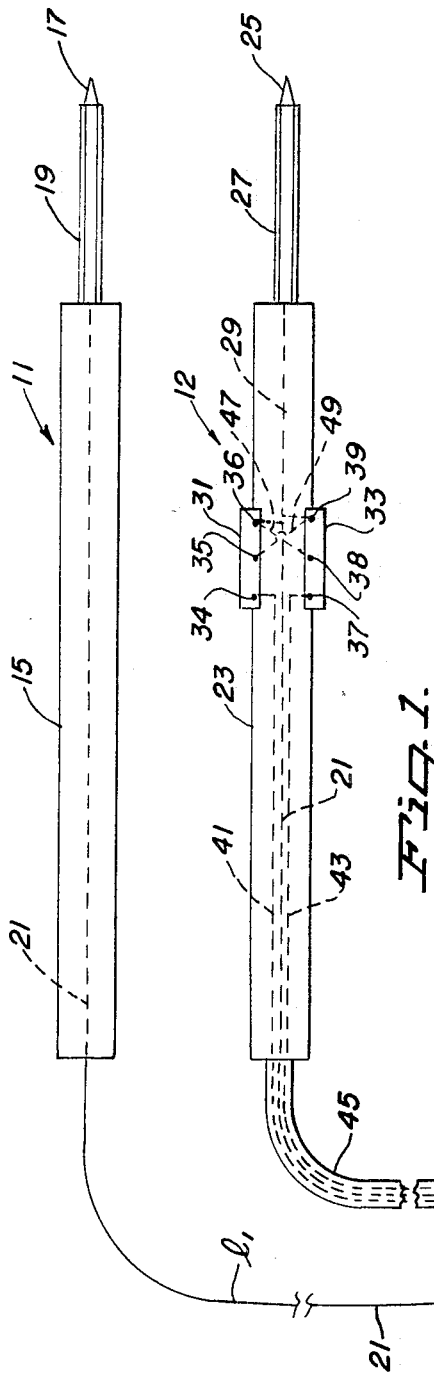
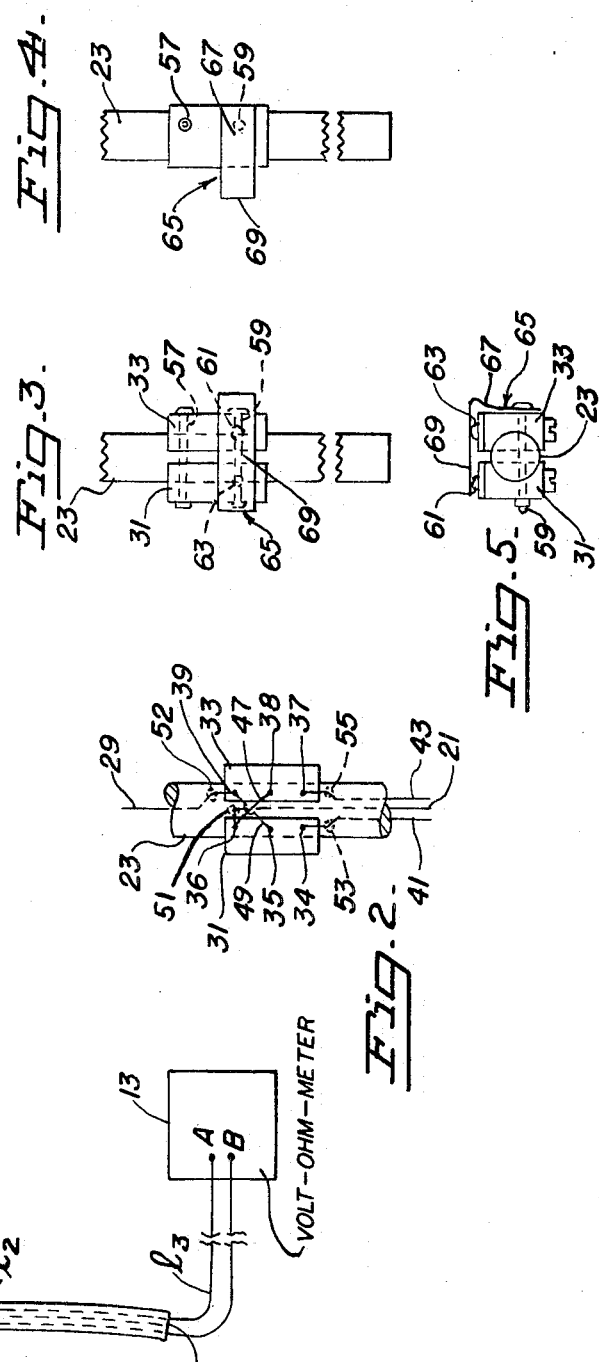
INVENTORS
RICHARD L. ROBERTS
DONALD S. McHUGH
BY *Charles H Curry*
ATTORNEY

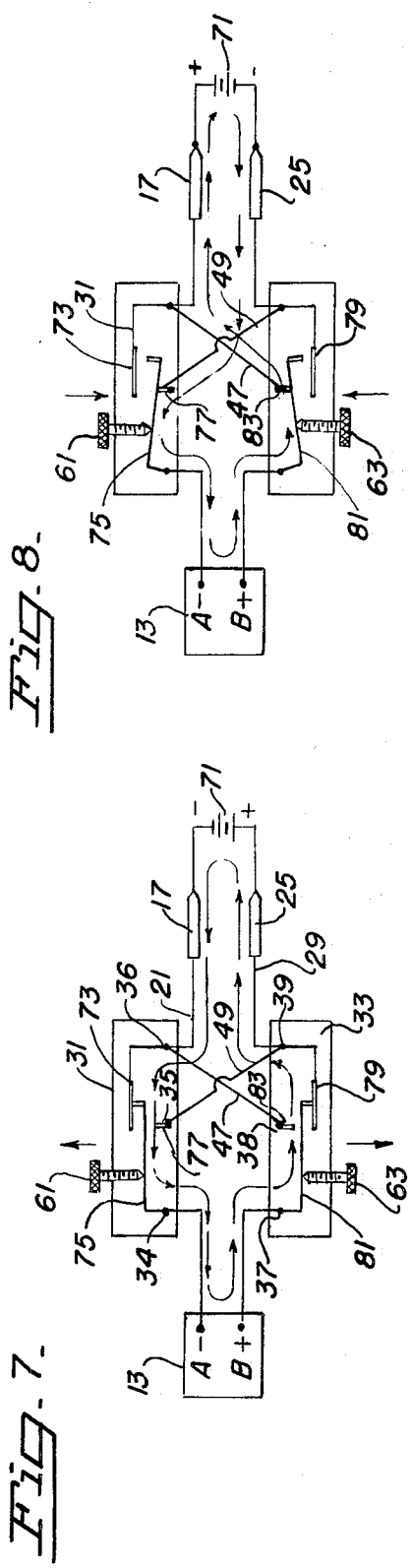
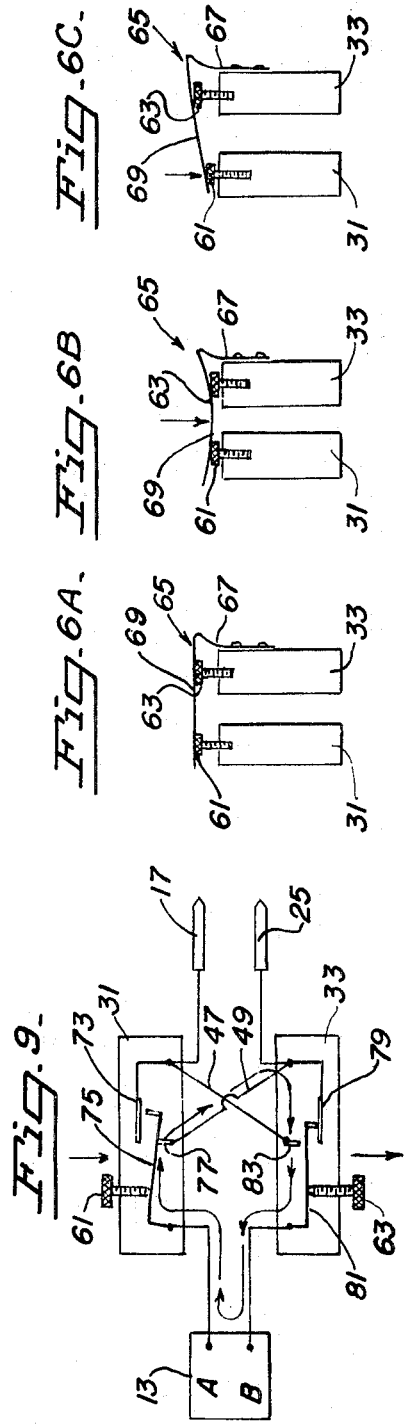
INVENTORS
RICHARD L. ROBERTS
DONALD S. McHUGH
BY Charles B Curry
ATTORNEY United States Patent Office 3,512,084
Patented May 12, 1970

3,512,084
ELECTRICAL TEST PROBE DEVICE WITH SHORTING AND REVERSING SWITCH MEANS
Richard L. Roberts, 513 San Carlos, Albany, Calif. 94706, and Donald S. McHugh, 3101 Wiswall Court, Richmond, Calif. 94806
Filed Oct. 18, 1967, Ser. No. 676,687
Int. Cl. G01r 31/02
U.S. Cl. 324—72.5                    3 Claims

ABSTRACT OF THE DISCLOSURE

A pair of electrical probes wherein one probe includes a switching device that functions to both electrically reverse the probes and electrically short the probes. In the preferred embodiment of the present invention a lever is placed over the switching elements of two micro switches. The micro switches electrically reverse the probes when the switching elements of both micro switches are actuated by depressing the center position of the lever. The micro switches electrically short out the probes when the switching element of one of the micro switches is actuated by depressing the outer position of the lever.

---

The present invention relates to a device for testing electrical components and more particularly to a test probe that makes it possible to conveniently short out and reverse the polarity of the test probe leads.

The invention described herein may be manufactured and used by or for the Government of the United States of America for governmental purposes without payment of any royalties thereon or therefor.

When testing an electrical circuit with a pair of test probes, which are normally connected to a volt-ohm-meter or other testing equipment, it is often difficult to know in advance the polarity of the particular component or the D.C. power source being tested. As a result the volt-ohm-meter will frequently read down-scale because the test probe leads are reversed. Therefore, to obtain an up-scale reading it has been necessary to physically remove the test probes from the electrical circuit, reverse the test probes, and then reinsert them into the electrical circuit. Another problem encountered in testing electrical circuits is that the volt-ohm-meter must be continuously monitored or zeroed by shorting the test probes. When working on an electrical circuit that has poor accessibility or one in which epoxy coating is used, these reversing and shorting operations become very time consuming and tedious and often result in shorting out the electrical circuit or otherwise injuring the components.

The present invention relates to a unique test probe device that obviates the above disadvantages and saves time and eliminates unnecessary work when testing electrical circuits. The present invention is particularly useful for checking, for example, forward and reverse currents in semi-conductor devices and D.C. voltage sources. When the test probes are applied to a circuit component and the volt-ohm-meter reads down-scale, rather than reverse the probes to obtain an up-scale reading, it is only necessary to depress the center of the lever on one of the test probes. The lever actuates a pair of switches that electrically reverses the polarity of both test probes, without physically reversing the probes, and the meter correctly reads up-scale. If it is desirable to short out the test probes the end of the same lever is depressed. This actuates one of the switches that electrically shorts the two test probes, without bringing the two test probes into physical contact, and the volt-ohm-meter may be zeroed.

Briefly, the present invention comprises a pair of electrical probes wherein one probe includes a switching device which functions to both electrically reverse the test probes and electrically short the test probes. In the preferred embodiment of the present invention a pair of micro switches is mounted on one of the test probes. In the preferred embodiment of the present invention a pair of micro switches is mounted on one of the test probes. The wires from the volt-ohm-meter are connected to the common terminals of the micro switches, the normally open contact of one switch is connected to the normally closed contact of the other switch, and the normally open contact of the other switch is connected to the normally closed contact of the one switch. In this manner both switches effectively make a double pole, double throw reversing switch. The normally closed contact of the switches are respectively connected to the probe tips of the two test probes. A lever is placed over the switching elements of the two micro switches. The micro switches electrically reverse the test probes when the switching elements of both micro switches are actuated by depressing the center position of the lever. The micro switches electrically short out the test probes when the switching elements of one of the micro switches is actuated by depressing the outer position of the lever.

Other objects, advantages and novel features of the invention will become apparent from the following detailed description of the invention when considered in conjunction with the accompanying drawings wherein:

FIG. 1 is a schematic diagram of the two test probes of the present invention;

FIG. 2 is a bottom elevation view of the switching device mounted on one of the test probes;

FIG. 3 is the top elevation view of FIG. 2;

FIG. 4 is the side elevation view of FIG. 3;

FIG. 5 is an end elevation view of FIG. 3;

FIGS. 6A, 6B and 6C are schematic drawings illustrating the various switching positions of the switching element;

FIG. 7 is a schematic diagram illustrating the current flow path of the test probes when the switching element is not actuated and corresponds with the drawing shown in FIG. 6A;

FIG. 8 is a schematic diagram illustrating the current flow path when both switching elements are actuated to provide an electrical reversal of the two test probes and corresponds with the drawing shown in FIG. 6B; and FIG. 9 illustrates the current flow path when one switching element is actuated to provide an electrical shorting of the two test probes and corresponds with the drawings shown in FIG. 6C.

In FIG. 1 is illustrated the testing device of the present invention and includes test probe 11, test probe 12, and volt-ohm-meter 13 to which the test probes are electrically connected. Test probe 11 includes cylindrical body 15, test probe tip 17 that is mechanically connected to body 15, sleeve 19 that is made of insulating material and is inserted over test probe tip 17, and lead wire 21 that is connected to tip 17 and passes through the length of body 15 as illustrated by the dotted line. Test probe 12 includes cylindrical body 23, test probe tip 25 that is mechanically connected to body 23, sleeve 27 that is made of insulating material and is inserted over test probe tip 25 and lead wire 29 that is connected to tip 25 and to micro switch 33. Micro switches 31 and 33 are respectively mounted on the opposite sides of body 23 of test probe 12. Micro switch 31 includes terminal 34 (the common terminal), terminal 35 (the normally open terminal) and terminal 36 (the normally closed terminal). Micro switch 33 includes terminal 27 (the common terminal), terminal 38 (the normally open terminal) and terminal 39 (the normally closed terminal). Lead wires 41 and 43 are respectively connected to terminals 34 and 37 at one end and at the other end to terminals A and B of volt-ohm-meter 13. Lead wires 21, 41 and 43 are enclosed by insulator 45 which preferably has a length $L_2$ of about 1 foot. The exposed length of lead wire 21, shown as $L_1$ in FIG. 1, is preferably about 2 feet. It has been found that these lengths are very satisfactory for most conditions of operation however, it is to be understood that these lengths may be departed from depending upon the particular needs. It should be particularly noted that lead wire 21 is inserted through insulator sleeve 45 and is connected to terminal 36 of micro switch 31. This not only provides the needed electrical connection for the proper switching as hereinafter described, but also provides for a convenient way of mechanically handling and packaging the lead wire and associated switching circuitry. The exposed lengths of lead wires 41 and 43, referred to as length $L_3$ in FIG. 1, is not critical, however, a convenient length has been found to be between 3 and 4 feet. Terminal 36 of micro switch 31 is electrically connected to terminal 38 of micro switch 33 by lead wire 47 and terminal 35 of micro switch 31 is electrically connected to terminal 39 of micro switch 33 by lead wire 49. In FIG. 2 are illustrated these electrical connections and one technique for connecting lead wires 26, 29, 41 and 43 to the appropriate terminals. This is achieved by passing lead wire 21 through opening 51, lead wire 29 through opening 52, lead wire 41 through opening 53, and lead wire 43 through opening 55 and then respectively connecting the lead wires to terminals 36, 39, 34, and 37.

In FIGS. 3, 4 and 5 are respectively illustrated the top, side and end elevation views of the switching elements of the present invention. From these drawings it can be seen that micro switches 31 and 33 are spaced apart, parallel, and are mounted in slots formed in the opposite sides of body 23 of test probe 12. Micro switches 31 and 33 and body 23 are held in fixed relation by means of fastening devices 57 and 59, such as bolts or rivets. This mounting may be achieved by forming an opening through micro switches 31 and 33 and through the center portion of body 23 as illustrated. Each of micro switches 31 and 33 respectively include switching elements 61 and 63 which function to switch the electrical connections of test probe tips 17 and 25 in the manner hereinafter described in connection with FIGS. 6A through FIG. 9. Mounted directly over switching elements 61 and 63 is actuating element 65. As best depicted in FIGS. 5, and 6A through 6C, actuating element 65, preferably made of spring steel, includes upward extending section 67 and horizontal extending section 69. The lower end of upward extending section 67 is attached to the body of micro switch 33 by fastening device 59. Horizontal extending section 69 of actuating element 65 is mounted directly over switching elements 61 and 63. The upper portion of upward extending section 67 is bent outward to permit greater flexibility of the actuating element and to permit the simultaneous actuation of switching elements 61 and 63 or only the actuation of switching element 63. Due to the spring action of actuating element 65, in the relaxed normal position, actuating element 65 is in the position illustrated in FIGS. 5 and 6A and is not actuating switching elements 61 and 63. However, when the center of horizontal extending section 69 of actuating element 65 is depressed, both of switching elements 61 and 63 are actuated and the polarity of the test probes are electrically reversed. When the left-most end of horizontal extending section 69 of actuating element 65 is depressed, then only switching element 61 is actuated and the test probes are electrically shorted. It should be noted that the switching action of micro switches 31 and 33 as depicted in FIGS. 7 through 9 are only illustrative and require that actuating element 65 be held in the depressed position to maintain the switched position. In the preferred embodiment each micro switch will remain in the switched position after actuating element 65 is released. This is desirable because it is then unnecessary to maintain actuating element 65 in one of the depressed positions while making the measurements in question. Micro switches that perform in either of the above-described manners are well known to those skilled in the art and a detailed description thereof is unnecessary.

The operation of the present invention will now be described in conjunction with the schematic drawings of FIGS. 6A through 9. At the outset it should be noted that the switching position illustrated in FIG. 7 corresponds to the non-actuated position of actuating element 65 of FIG. 6A. The switching position illustrated in FIG. 8 corresponds to the actuated position of actuating element 65 of FIG. 6B, and the switching position illustrated in FIG. 9 corresponds to the actuated position of actuating element 65 of FIG. 6C. In FIG. 7 is illustrated the use of the test probes of the present invention in the normal position when used to measure a D.C. voltage source having the polarity indicated. In this situation volt-ohm-meter 13 reads up-scale as desired. From FIG. 7 it will be noted that test probe tip 17 is connected to the negative side of D.C. source 71 and test probe tip 25 is connected to the positive side of D.C. source 71. The current flow path is assumed to be from negative to positive as illustrated by the arrows. Test probe tip 17 is connected to lead wire 21 which is in turn connected to terminal 36 of micro switch 31. Terminal 36 is electrically connected to conductor element 73 which is electrically connected to conductor element 75, which is electrically connected to terminal 34. From the schematic illustration of FIG. 7 it can therefore be seen that the negative potential applied to test probe tip 17 is applied directly to terminal A of volt-ohm-meter 13 and the positive potential applied to test probe tip 25 is applied directly to terminal B of volt-ohmmeter 13. With these negative and positive potentials respectively applied to terminals A and B the volt-ohm-meter will read up-scale. When switching element 61 is in the relaxed position, as indicated, then the spring bias of conducting element 75 causes contact of conducting element 75 with the end of conducting element 73.

In FIG. 8 is illustrated the reversal of polarities of source 71 wherein a positive potential is applied to test probe tip 17 and a negative potential is applied to test probe tip 25. If no switching action were present and this same reversal of positive and negative potentials were applied to the circuit shown in FIG. 7, then terminal A would have a positive potential and terminal B would have a negative potential which would cause meter 13 to read down-scale. To obviate this condition switching elements 61 and 63 are depressed downward by actuating the center of horizontal extending section 69 as shown in FIG. 6B. In FIG. 8 is illustrated the use of the test probes when switching elements 61 and 63 are depressed. When switching element 61 is depressed downward then conducting element 75 is depressed downward and the free end disengages from electrical contact with conducting element 73 and engages with conducting element 77. When switching element 63 is depressed downward then conducting element 81 is depressed downward and the free end disengages from electrical contact with conducting element 79 and engages with conducting element 83. From the schematic illustration of FIG. 8 it can be seen that the positive potential applied to test probe tip 17 is applied directly to terminal B of volt-ohm-meter 13 and the negative potential applied to test probe tip 25 is applied directly to terminal A of volt-ohm-meter 13. Therefore, since switching element 61 and 63 are depressed by actuation of horizontal extending section 69, volt-ohm-meter 13 will read up-scale even though the positive and negative potentials of source 71 are reversed, making it unnecessary to physically reverse the test probes.

In FIG. 9 is schematically illustrated the electrical shorting of test probe tips 17 and 25 by depressing the free end of horizontal extending section 69 that actuates only switching element 61, as illustrated in FIG. 6C. If neither of the switching elements (FIG. 7) or both of switching elements (FIG. 8) were depressed, then there would be an open circuit unless test probe tips 17 and 25 were physically connected. However, when switching element 61 is depressed then conductor element 75 engages conductor element 77 and through wire 49 is connected to conductor element 79 which is connected to conductor element 81. In this manner terminals A and B of volt-ohm-meter 13 are shorted out without actually bringing the test probe tips into physical contact.

Obviously many modifications and variations of the present invention are possible in the light of the above teachings. It is therefore to be understood that within the scope of the appended claims the invention may be practiced otherwise than as specifically described.

What is claimed is:

1. An electrical device comprising:
   (a) first and second electrical probes;
   (b) at least one of said probes having a handle;
   (c) switching means operatively connected to said first and second electrical probes for selectively either electrically shorting said first and second electrical probes or for electrically reversing said first and second electrical probes;
   (d) said switching means mounted on the handle of one of said electrical probes;
   (e) said switching means comprising first and second switches that are mounted adjacent to each other on said one of said probes;
   (f) said first and second switches respectively including first and second switching elements; and
   (g) a spring lever positioned over said first and second switching elements for depressing only said first switching element or for depressing both said first and second switching elements.

2. The device of claim 1 wherein:
   (a) the lead wire from said second electrical probe is connected to the normally closed contact of said first switch;
   (b) the lead wire from said first electrical probe is connected to the normally closed contact of said second switch;
   (c) the normally closed contact of said first switch is connected to the normally open contact of said second switch;
   (d) the normally open contact of said second switch is connected to the normally closed contact of said first switch; and
   (e) the common terminals of said first and second switches are connected to lead wires which may be operatively connected to an electrical measuring instrument.

3. The device of claim 2 wherein:
   (a) said first switch includes a switching element for selectively connecting said common terminal to said normally closed contact or to said normally open contact of said first switch; and
   (b) said second switch includes a switching element for selectively connecting said common terminal to said normally closed contact or to said normally open contact of said second switch.

References Cited

UNITED STATES PATENTS

| | | | |
|---|---|---|---|
| 1,606,063 | 11/1926 | Edwards | 324—149 XR |
| 2,771,580 | 11/1956 | Schott | 324—72.5 |

RUDOLPH V. ROLINEC, Primary Examiner

E. L. STOLARUN, Assistant Examiner

U.S. Cl. X.R.

324—149